United States Patent
Zheng et al.

(10) Patent No.: US 9,435,217 B2
(45) Date of Patent: *Sep. 6, 2016

(54) SWIRL INTERRUPTION SEAL TEETH FOR SEAL ASSEMBLY

(71) Applicant: General Electric Company, Schenectady, NY (US)

(72) Inventors: Xiaoqing Zheng, Niskayuna, NY (US); Daniel Mark Brown, Altamont, NY (US); Jason Winfred Jewett, Clifton Park, NY (US); Fred Thomas Willett, Jr., Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,726

(22) Filed: Oct. 6, 2015

(65) Prior Publication Data
US 2016/0024954 A1 Jan. 28, 2016

Related U.S. Application Data

(63) Continuation of application No. 13/609,443, filed on Sep. 11, 2012, now Pat. No. 9,200,528.

(51) Int. Cl.
*F01D 11/02* (2006.01)
*F01D 11/08* (2006.01)
*F16J 15/447* (2006.01)

(52) U.S. Cl.
CPC .............. *F01D 11/02* (2013.01); *F01D 11/08* (2013.01); *F16J 15/4472* (2013.01); *F05D 2220/32* (2013.01); *F05D 2240/55* (2013.01); *F05D 2250/191* (2013.01); *F05D 2260/14* (2013.01)

(58) Field of Classification Search
CPC ...... F01D 11/02; F01D 11/08; F16J 15/4472
USPC ..................... 415/170.1, 173.1, 173.4–173.6
See application file for complete search history.

(56) References Cited

U.S. PATENT DOCUMENTS

| | | | |
|---|---|---|---|
| 3,957,439 A | 5/1976 | Prescott et al. | |
| 4,017,088 A * | 4/1977 | Lerjen | F16J 15/441 277/416 |
| 4,108,732 A | 8/1978 | Nuttall, Jr. | |
| 4,240,905 A | 12/1980 | Scaccia | |
| 4,434,937 A | 3/1984 | Pitchford | |
| 4,496,103 A | 1/1985 | Pitchford | |
| 4,498,626 A | 2/1985 | Pitchford | |
| 4,546,609 A | 10/1985 | Roullet et al. | |

(Continued)

OTHER PUBLICATIONS

Lee Jr., Non-final Office Action, Dated Nov. 21, 2014, 9 Pages.

(Continued)

*Primary Examiner* — Woody Lee, Jr.
(74) *Attorney, Agent, or Firm* — Hoffman Warnick LLC; Ernest G. Cusick

(57) ABSTRACT

A seal assembly for sealing between a rotating component and a stationary component in a turbomachine. The seal assembly includes a plurality of radially inwardly projecting, axially spaced teeth extending from the stationary component, wherein at least one of the plurality of teeth has at least one axially extending hole therethrough. Axial flow of an operating fluid through the holes acts as an air-curtain to interrupt swirl flow in a seal cavity, therefore reducing steam force that could act to destabilize rotordynamics.

20 Claims, 6 Drawing Sheets

(56) References Cited

U.S. PATENT DOCUMENTS

| | | | |
|---|---|---|---|
| 4,625,914 A | 12/1986 | Sexton et al. | |
| 4,787,558 A | 11/1988 | Sexton et al. | |
| 4,807,667 A | 2/1989 | Ohnhaus | |
| 4,989,411 A | 2/1991 | Hoopes et al. | |
| 6,102,655 A | 8/2000 | Kreitmeier | |
| 6,126,391 A | 10/2000 | Atraghji et al. | |
| 6,905,112 B2 | 6/2005 | Konijn et al. | |
| 6,932,350 B1* | 8/2005 | Husted | F16J 15/406 277/421 |
| 7,575,412 B2 | 8/2009 | Seitz | |
| 7,640,850 B2 | 1/2010 | Bronnert | |
| 7,731,476 B2 | 6/2010 | Ganelin et al. | |
| 8,506,237 B2 | 8/2013 | Japikse et al. | |
| 8,915,705 B2* | 12/2014 | Eelman | F01D 11/025 415/171.1 |
| 2005/0067789 A1 | 3/2005 | McHale et al. | |
| 2008/0265513 A1* | 10/2008 | Justak | F01D 11/025 277/301 |
| 2009/0000272 A1 | 1/2009 | Cloft | |
| 2011/0020114 A1 | 1/2011 | Eelman | |
| 2011/0076146 A1 | 3/2011 | Falcone et al. | |
| 2012/0183388 A1 | 7/2012 | Vannini et al. | |
| 2013/0156553 A1 | 6/2013 | Mitaritonna et al. | |

OTHER PUBLICATIONS

Lee Jr., Final Office Action, Dated Mar. 5, 2015, 10 Pages.
Lee Jr., Notice of Allowance, Dated Aug. 4, 2015, 15 Pages.
Hendricks et al., "Turbomachine Sealing and Secondary Flows", NASA Lewis Research Center, 2004, 80 Pages.

* cited by examiner

SWIRL INTERRUPTION SEAL TEETH FOR SEAL ASSEMBLY

This application is a continuation of currently pending U.S. patent application Ser. No. 13/609,443 filed on Sep. 11, 2012. The application identified above is incorporated herein by reference in its entirety for all that it contains in order to provide continuity of disclosure.

BACKGROUND OF THE INVENTION

The present invention relates generally to a seal assembly, and more particularly to a seal assembly including at least one seal tooth having at least one hole to reduce swirl-induced rotordynamic instability.

In rotary machines such as turbines, seals are provided between rotating and stationary components. For example, in steam turbines, it is customary to provide a plurality of arcuate packing ring segments to form an annular labyrinth seal between the stationary and rotating components. Typically, the arcuate packing ring segments (typically, four to six per annular seal) are disposed in an annular groove in the stationary component concentric to the axis of rotation of the machine and hence concentric to the sealing surface of the rotating component. Each arcuate seal segment carries an arcuate seal face in opposition to the sealing surface of the rotating component. In labyrinth type seals, a plurality of axially spaced, circumferentially extending seal teeth extend from the stationary component toward the rotating component. The sealing function is achieved by creating turbulent or flow restriction of an operative fluid, for example, steam, as it passes through the relatively tight clearances within the labyrinth defined by the seal face teeth and the opposing surface of the rotating component.

In operation, with high rotor rotational velocity, fluid axially entering the fluid path of a rotary machine can acquire a significant tangential velocity component (also called "steam swirl"). For example, as the fluid moves through the labyrinth seal, the fluid may flow between the axially spaced seal teeth and circumferentially around the rotating component. This causes the fluid to acquire the significant tangential velocity component, which can induce rotor instabilities in turbomachines. The magnitude of this rotor instability is a function of the circumferential flow component of fluid within the labyrinth seal.

As more and tighter seals are used in steam turbines, swirl-induced rotordynamic instability becomes more critical for large steam applications. Conventional anti-swirl teeth take up additional axial space and are not rub-friendly, because the clearance has to be set large enough to avoiding rubbing against a rotor generating a lot of heat. To reduce the risk of scoring the rotor, conventional seal segments with anti-swirl features are typically assembled into a stationary component with a spring element to allow the seal ring to move away from the stationary component in case of rotor rubbing.

BRIEF DESCRIPTION OF THE INVENTION

Embodiments of this invention include a seal assembly for sealing between a rotating component and a stationary component in a turbomachine. The seal assembly includes a plurality of radially inwardly projecting, axially spaced teeth extending from the stationary component, wherein at least one of the plurality of teeth has at least one axially extending hole therethrough. Axial flow of an operating fluid through the holes acts as an air-curtain to interrupt swirl flow in a seal cavity, therefore reducing steam force that could act to destabilize rotordynamics.

A first aspect of the invention provides a seal assembly for sealing between a rotating component and a stationary component in a turbomachine, the seal assembly comprising: a plurality of radially inwardly projecting, axially spaced teeth extending from the stationary component, wherein at least one of the plurality of teeth has at least one axially extending hole therethrough.

A second aspect of the invention provides a turbomachine comprising: a rotating element; a stationary component substantially surrounding the rotating element; and a seal assembly coupled to the stationary component, the seal assembly including: a plurality of radially inwardly projecting, axially spaced teeth extending from the stationary component, wherein at least one of the plurality of teeth has at least one axially extending hole therethrough.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
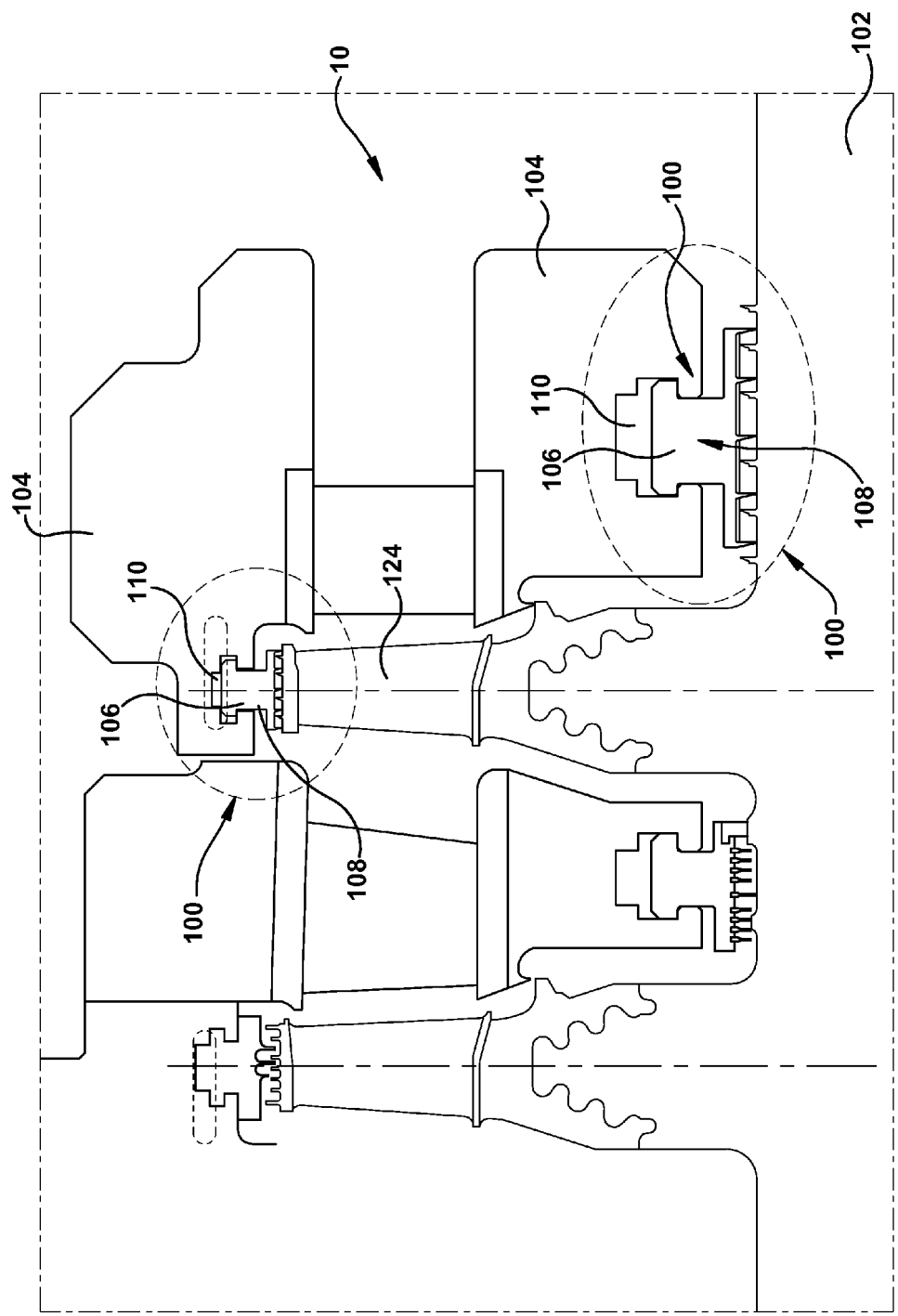
FIG. 1 shows a partial cross-sectional view of turbomachine including a seal assembly according to an embodiment of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Turning to FIG. 1, a partial cross-sectional view of a machine 10 including a labyrinth seal 100 according to an embodiment of the invention is shown. Although FIGS. 1-4 are shown and discussed with respect to a steam turbine, it is understood that the teachings of the various embodiments of the invention may be similarly applied to other turbomachines and that a steam turbine is merely used as an example of one type of turbomachine to describe the aspects of the invention.

Figure 2:
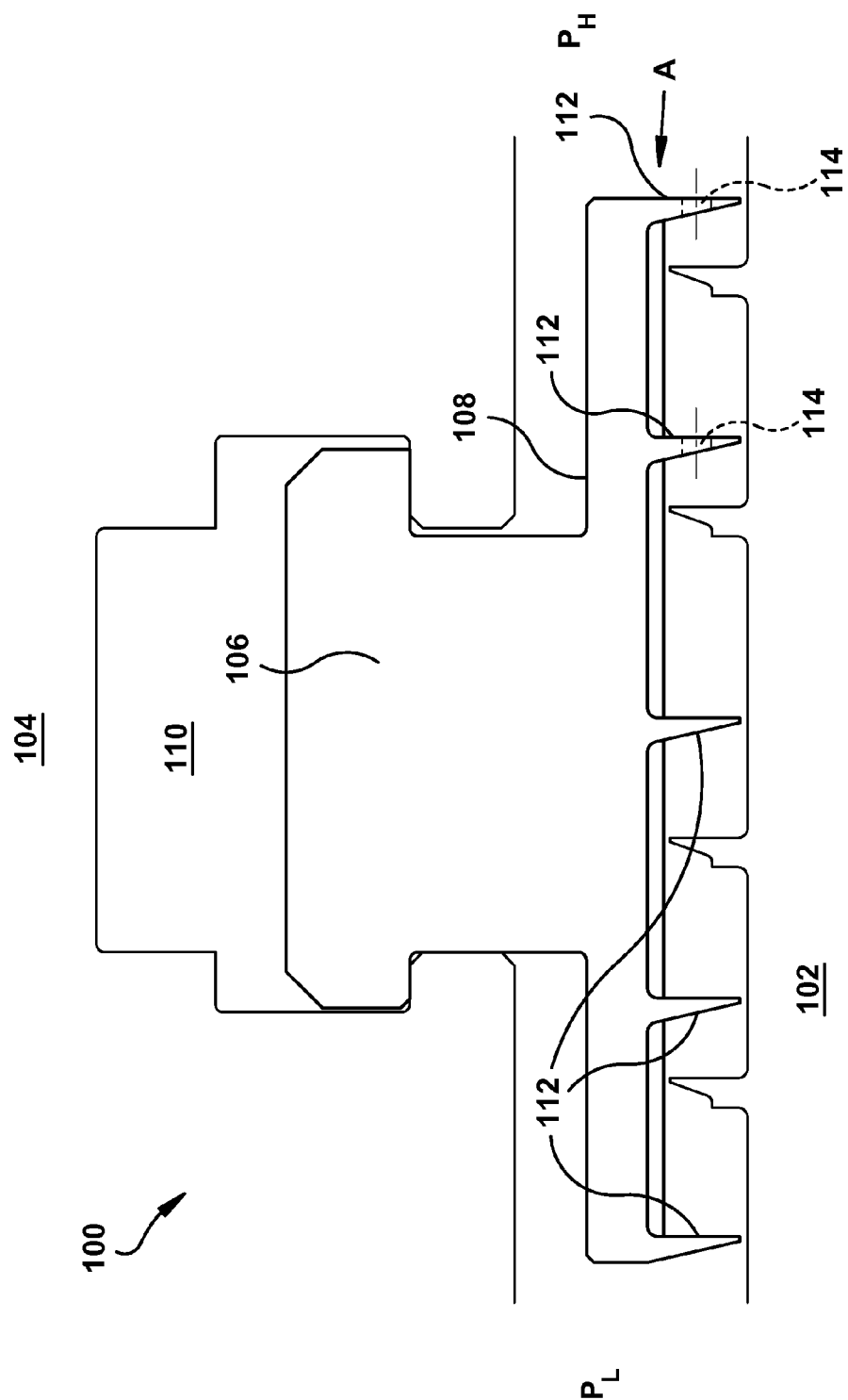
FIG. 2 shows a cross-sectional view of a seal system according to an embodiment of the invention.

Turning to FIG. 1, turbomachine 10 includes a rotating element 102 and a stationary component 104. Stationary component 104 may substantially surround rotating element 102. Turbomachine 10 also includes at least one seal assembly 100 coupled to stationary component 104. As shown in FIG. 2, in one embodiment, seal assembly 100 may be coupled to stationary component 104 by fitting a mounting portion 106 of an arcuate packing ring 108 within a groove 110 of stationary component 102.

Seal assembly 100 may include a plurality of arcuate packing rings 108 (only one shown). Arcuate packing rings 108 may be configured to form an annulus that proximately surrounds rotating element 102. In the embodiment shown in FIG. 2, seal assembly 100 comprises a labyrinth seal, having a plurality of radially inwardly projecting, axially spaced teeth 112 extending from stationary component 104 toward rotating component 102. The plurality of seal teeth 112 can be coupled to each arcuate packing ring 108. Plurality of seal teeth 112 may be coupled to each arcuate packing ring 108 according to any now known or later developed manner, such as, but not limited to, embedded, caulked, or machined. Plurality of seal teeth 112 extend in a radial direction towards rotating element 102 and also in a circumferential direction around rotating element 102, such that plurality of seal teeth 112 seal against flow leakage that may be present along machine 10 (FIG. 1). As shown in FIG. 2, labyrinth seal system 100 has an upstream, high pressure side, $P_H$, and a downstream, low pressure side, $P_L$. Operating fluid from a turbomachine 10 (FIG. 1) flows through seal 100 from high pressure side, $P_H$, to low pressure side, $P_L$.

As shown in FIG. 2, according to an embodiment of the invention, at least one seal tooth 112 of plurality of seal teeth 112 may include a hole 114 that extends through seal tooth 112 in the axial direction of rotating element 102. As discussed herein, at least one hole 114 acts to reduce the rotor induced swirl between the plurality of seal teeth 112 and rotating element 102.

Figure 3:
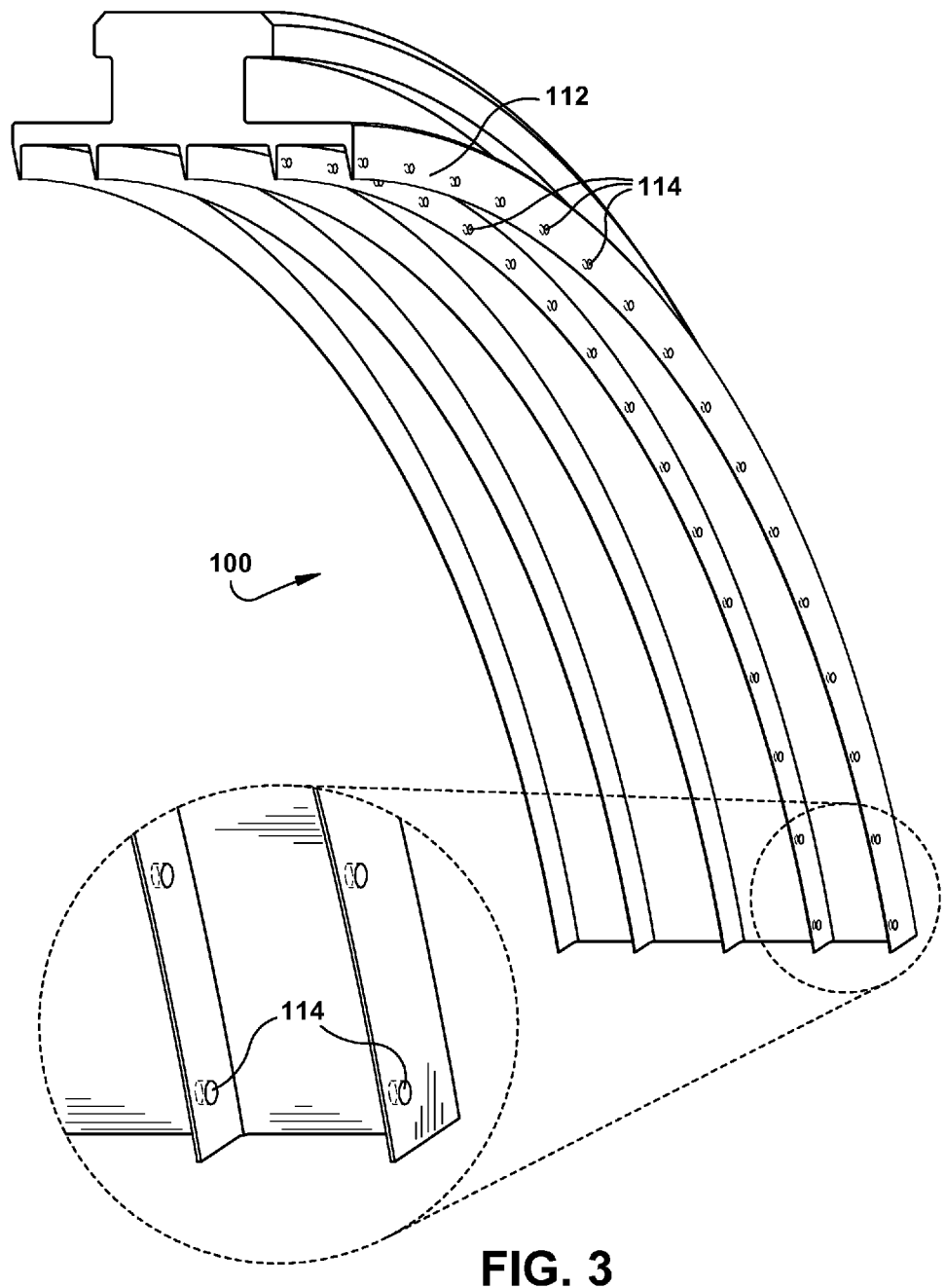
FIG. 3 shows partial perspective view of a seal assembly according to an embodiment of the invention.

Each hole 114 can extend in an axial direction through a seal tooth 112, and a plurality of holes 114 can be included along a circumferential direction along an arcuate portion of seal teeth 112 (e.g., in an arcuate portion of seal assembly 100 shown in FIG. 3).

Figure 5:
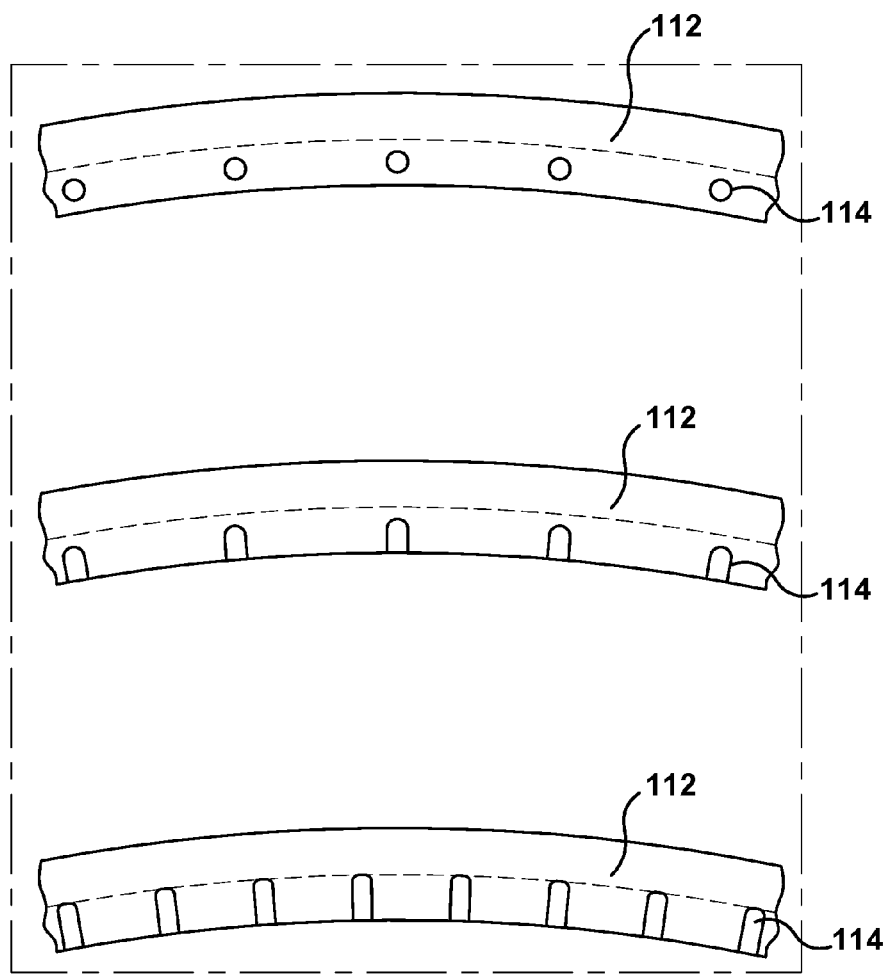
FIG. 5 shows cross-sectional views of various alternative geometries of holes in a seal tooth, taken along view A in FIG. 2 and FIG. 4, according in embodiments of the invention.

Holes 114 can comprise any shape or size desired. For example, three different shape holes 114 can be seen in FIG. 5. In the first example, substantially cylindrical holes 114 are included through a seal tooth 112. Cylindrical holes 114 can comprise substantially cylindrical, tubular holes through a seal tooth 112. In the second example, holes 114 also comprise slots extending through seal teeth 112 in an axial as well as circumferential direction. As shown in FIG. 5, a rounded slot or cut-out is made through a distal end of seal tooth 112, such that a rounded, rectangular, tubular hole is formed through seal tooth 112. In the third example, a rounded cut-out is made similar to the second example, but in this example, the cut-out extends from a distal end of seal tooth 112 into a substantial root of the seal tooth 112.

Figure 6:
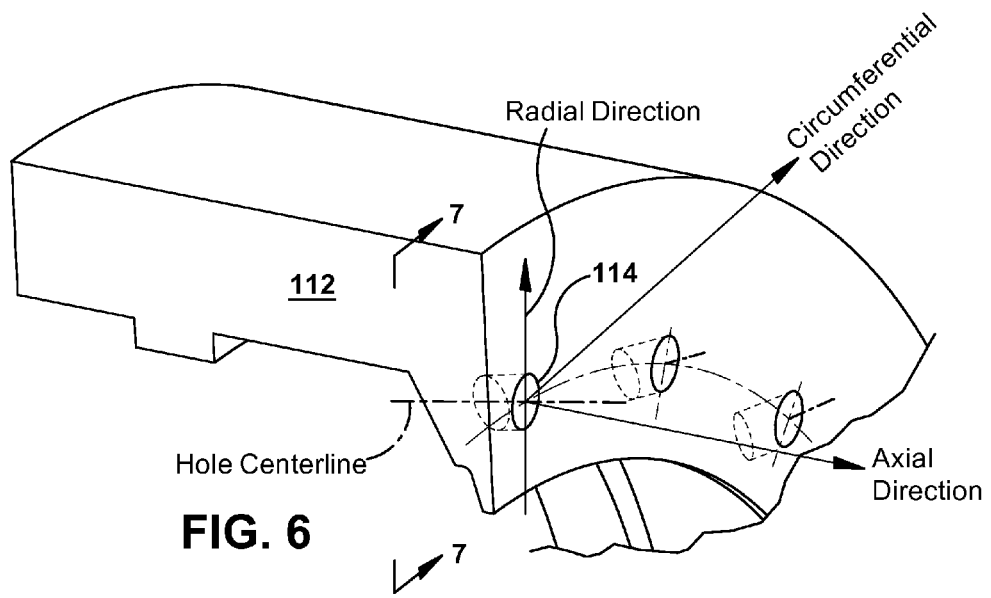
FIG. 6 shows a close up perspective view of a seal tooth of a seal assembly according to an embodiment of the invention.
Figure 7:
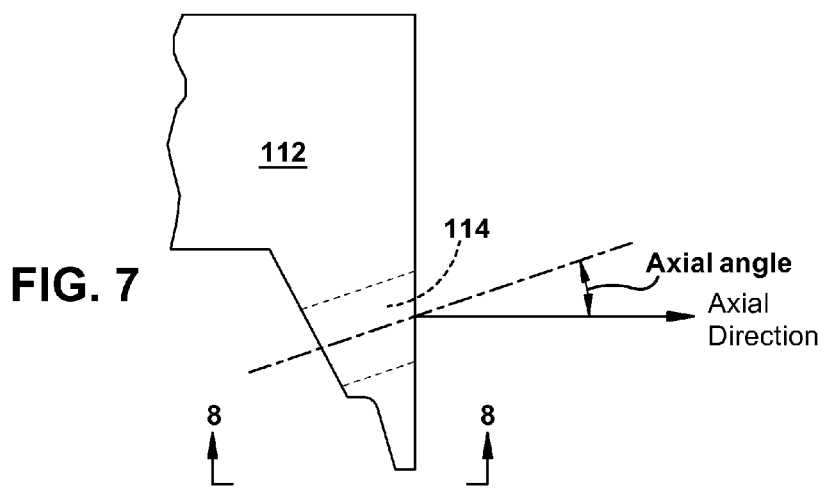
FIG. 7 shows a cross-sectional view of a seal tooth, taken along view 7-7 in FIG. 6, according to an embodiment of the invention.
Figure 8:
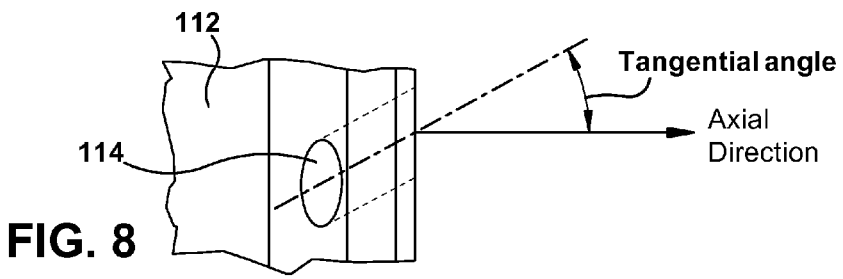
FIG. 8 shows a cross-sectional view of a seal tooth, taken along view 8-8 in FIG. 7, according to an embodiment of the invention.

In one embodiment, holes 114 can extend through seal teeth 112 substantially horizontally, i.e., parallel to a centerline of rotating component 102. In another embodiment, as illustrated in FIGS. 6-8, holes 114 can extend through seal teeth 112 at an axial angle, i.e., not parallel to a centerline of rotating component 102. An angled hole 114 could be used to increase a flow path of operating fluid through seal assembly 100, and/or to increase or decrease the swirl interruption as desired. For example, the more axially angled the hole 114 is (i.e., the more angled away from parallel to rotating component 102 centerline), the longer the flowpath within hole 114 becomes, and the more effective swirl interruption will result. In one embodiment, holes 114 can be angled at an axial angle in the range of approximately 0 degrees to approximately 90 degrees. As shown in FIGS. 6-8, holes 114 can be also angled circumferentially in tangential direction with respect to a radial direction and axial direction of rotating component 102 to generate a circumferential velocity component against swirl flow direction. In one embodiment, holes 114 can be angled at a tangential angle in the range of approximately 0 degrees to approximately 60 degrees.

Holes 114 can be included in any seal tooth 112 desired, but in one embodiment, holes 114 can be included only in a first, upstream tooth 112 (see, e.g., FIG. 3), or first and second upstream teeth 112 (see, e.g., FIG. 2). Including holes 114 in the upstream teeth 112 allows for adequate swirl reduction, as discussed herein, while also allowing the downstream teeth 112 without holes to provide adequate sealing.

Seal teeth 112 that include holes 114 act as swirl interruption teeth, rather than primarily sealing teeth, since teeth 112 with holes 114 allow operative fluid to flow therethrough. Therefore, the purpose of teeth 112 with holes 114 is primarily to reduce swirl of operative fluid through seal assembly 110, rather than primarily to reduce operative fluid from passing between rotating component 102 and stationary component 104 as is the function of seal teeth 112 without holes 114.

In one embodiment, holes 114 in adjacent seal teeth 112 can be positioned circumferentially such that holes 114 are axially aligned for ease of manufacture (as shown in FIG. 3), or in another embodiment, holes 114 can be staggered circumferentially such that holes 114 are not aligned, e.g., if holes 114 are drilled in a skewed angle circumferentially.

Figure 4:
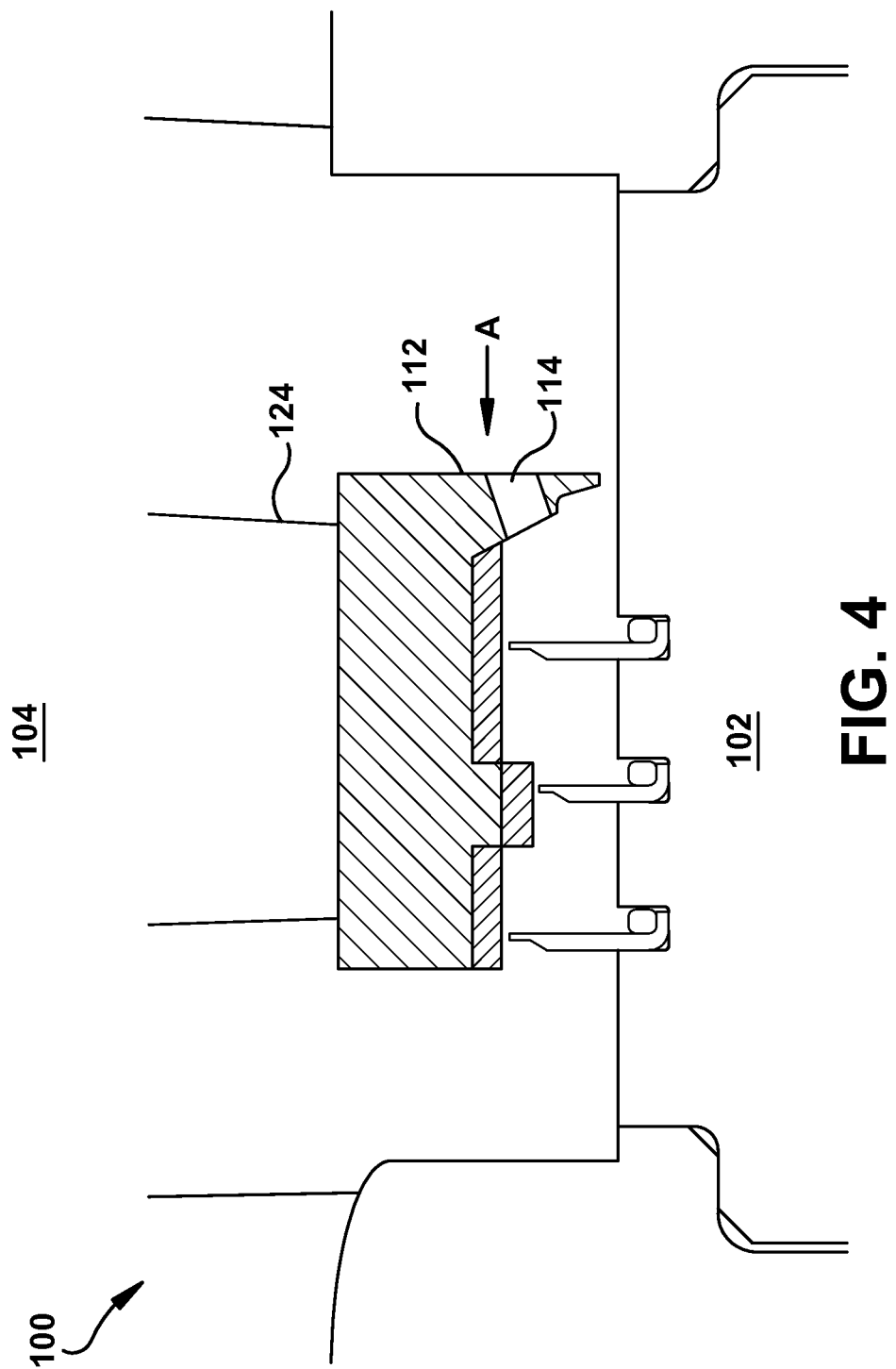
FIG. 4 shows a cross-sectional view of a seal system according to an embodiment of the invention.

In the embodiment shown in FIG. 4, the seal tooth 112 with anti-swirl holes 114 is an integral part of stationary component 104. This configuration has the additional benefit of a compact design. In contrast, conventional anti-swirl features typically use axially angled teeth, which need significant axial width to be effective in turning the flow direction. Those conventional anti-swirl teeth are stiff and not rotor rub-friendly, and need to be implemented on a segmented packing ring, which is installed into stationary component via a spring means to allow relative motion between seal segment and stationary component. In contrast, the anti-swirl features disclosed in embodiments of this invention are implemented on a thin tooth, not a thicker, axially angled, tooth. Therefore, seal teeth 112 of the claimed invention can be an integral part of stationary component 104, or can be rigidly attached, or linked, to a non-moving portion stationary component 104, without imposing risk of damaging rotating component 102. Therefore, in the embodiment shown in FIG. 4, integral teeth 112 do not move towards/away from rotating component 102.

In another embodiment, shown in FIG. 2, seal teeth 112 are mounted on packing ring 108, and mounting portion 106 of packing ring 108 is positioned within a circumferential groove 110 such that mounting portion 106 can move radially within groove 110. As in conventional labyrinth seals, mounting portion 106 moves radially (e.g., using a spring, not shown) towards and away from rotating component, to move seal teeth 112 to/away from rotating component 102.

Seal teeth 112 including holes 114 can act to move operating fluid moving through seal assembly 100 through holes 114. This will create an air curtain effect, and the axial jet-flow through holes 114 will interrupt swirl flow in the seal cavity, therefore improving rotordynamics stability. Swirl interruption features described herein can be used to mitigate field issue with rotordynamics. For example, if a turbine is identified with high rotor vibration due to steam swirl, swirl interruption features (e.g., holes 114 as shown in FIG. 2 and FIG. 4) can be easily added to existing inward teeth to reduce swirl.

As mentioned above, seal assembly 100 may be configured to form an annulus that proximately surrounds rotating element 102. Referring back to FIG. 1, seal assembly 100 may proximately surround any portion of rotating element 102 that requires leakage prevention and swirl reduction. For example, seal assembly 100 may proximately surround rotor 102. Alternatively, seal assembly 100 may proximately surround bucket assembly 124 to reduce bucket tip leakage and swirl.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the various embodiments of the present invention, including the best mode, and also to enable any person skilled in the art to practice the invention, including making and using any devices or systems and performing any incorporated methods. The patentable scope of the various embodiments of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly for sealing between a rotating component and a stationary component in a turbomachine, the seal assembly comprising:
    a plurality of radially inwardly projecting, axially spaced teeth extending from the stationary component, wherein at least one tooth of the plurality of teeth has at least one axially extending hole therethrough, the axially extending hole extending through the at least one tooth from an upstream, high-pressure side to a downstream, low-pressure side of the at least one tooth and being distanced radially inwardly from a radially innermost surface of an arcuate packing ring,
    wherein the upstream, high-pressure side is in fluid communication with the downstream, low-pressure side via the at least one axially extending hole.

2. The seal assembly of claim 1, wherein the at least one tooth having the at least one axially extending hole therethrough comprises a first tooth on the upstream, high-pressure side.

3. The seal assembly of claim 1, wherein the at least one tooth having the at least one axially extending hole therethrough comprises a first tooth and a second tooth on the upstream, high-pressure side.

4. The seal assembly of claim 1, wherein the plurality of teeth comprise arcuate segments of teeth, and wherein the at least one axially extending hole comprises a plurality of circumferentially spaced holes along the arcuate portion of teeth.

5. The seal assembly of claim 1, wherein the at least one axially extending hole comprises a substantially cylindrical, tubular hole.

6. The seal assembly of claim 1, wherein the at least one axially extending hole comprises a slotted cut-out at a distal end of the at least one tooth.

7. The seal assembly of claim 1, wherein the at least one axially extending hole extends axially through the at least one tooth at an axial angle with respect to a centerline of the rotating component and at tangential angle with respect to a circumferential direction of the rotating component, wherein the axial angle is in the range of approximately 0 degrees to approximately 90 degrees and the tangential angle is in the range of approximately 0 degrees to approximately 60 degrees.

8. The seal assembly of claim 1, the seal assembly having a plurality of arcuate portions, each arcuate portion including an arcuate packing ring, wherein each arcuate packing ring is moveably mounted in a circumferential groove in the stationary component.

9. The seal assembly of claim 1, wherein the rotating element is a rotor.

10. A turbomachine comprising:
    a rotating element;
    a stationary component substantially surrounding the rotating element; and
    a seal assembly coupled to the stationary component, the seal assembly including:
        a plurality of radially inwardly projecting, axially spaced teeth extending from the stationary component, wherein at least one tooth of the plurality of teeth has at least one axially extending hole therethrough, the axially extending hole extending through the at least one tooth from an upstream, high-pressure side to a downstream, low-pressure side of the at least one tooth and being distanced radially inwardly from a radially innermost surface of an arcuate packing ring,
        wherein the upstream, high-pressure side is in fluid communication with the downstream, low-pressure side via the at least one axially extending hole.

11. The turbomachine of claim 10, wherein the at least one tooth having the at least one axially extending hole therethrough comprises a first tooth on the upstream, high-pressure side.

12. The turbomachine of claim 10, wherein the at least one tooth having the at least one axially extending hole therethrough comprises a first tooth and a second tooth on the upstream, high-pressure side.

13. The turbomachine of claim 10, wherein the plurality of teeth comprise arcuate segments of teeth, and wherein the at least one axially extending hole comprises a plurality of circumferentially spaced holes along the arcuate portion of teeth.

14. The turbomachine of claim 10, wherein the at least one axially extending hole comprises substantially cylindrical, tubular hole.

15. The turbomachine of claim 10, wherein the at least one axially extending hole comprises a slotted cut-out at a distal end of the at least one tooth.

16. The turbomachine of claim 10, wherein the at least one axially extending hole extends axially through the at least one tooth at an axial angle with respect to a centerline of the rotating component and at tangential angle with respect to a circumferential direction of the rotating component, wherein the angle is in the range of approximately 0 degrees to approximately 90 degrees, and the tangential angle is in the range of approximately 0 degrees to approximately 60 degrees.

17. The turbomachine of claim 10, the seal assembly having a plurality of arcuate portions, each arcuate portion including an arcuate packing ring, wherein each arcuate packing ring is moveably mounted in a circumferential groove in the stationary component.

18. The turbomachine of claim 10, wherein the rotating element is a rotor.

19. The turbomachine of claim 10, wherein the seal assembly is an integral part of the stationary component.

20. The turbomachine of claim 10, wherein the seal assembly is rigidly attached to the stationary component.

\* \* \* \* \*